United States Patent
Lee et al.

(10) Patent No.: US 11,228,029 B2
(45) Date of Patent: Jan. 18, 2022

(54) METHOD FOR PRODUCING LITHIUM METAL NEGATIVE ELECTRODE STRUCTURE AND LITHIUM METAL NEGATIVE ELECTRODE STRUCTURE

(71) Applicant: LG CHEM, LTD., Seoul (KR)

(72) Inventors: Sangkyun Lee, Daejeon (KR); Baeck Boem Choi, Daejeon (KR); Cha Hun Ku, Daejeon (KR); Minwook Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 195 days.

(21) Appl. No.: 16/604,930

(22) PCT Filed: Sep. 6, 2018

(86) PCT No.: PCT/KR2018/010431
§ 371 (c)(1),
(2) Date: Oct. 11, 2019

(87) PCT Pub. No.: WO2019/083156
PCT Pub. Date: May 2, 2019

(65) Prior Publication Data
US 2020/0161647 A1     May 21, 2020

(30) Foreign Application Priority Data

Oct. 27, 2017    (KR) ........................ 10-2017-0141502
Sep. 5, 2018    (KR) ........................ 10-2018-0105740

(51) Int. Cl.
*H01M 4/66*     (2006.01)
*H01M 4/38*     (2006.01)
(Continued)

(52) U.S. Cl.
CPC ......... *H01M 4/382* (2013.01); *H01M 4/1395* (2013.01); *H01M 4/667* (2013.01);
(Continued)

(58) Field of Classification Search
None
See application file for complete search history.

(56) References Cited

U.S. PATENT DOCUMENTS

| | | |
|---|---|---|
| 4,503,088 A | 3/1985 | Fleischer |
| 6,335,114 B1 | 1/2002 | Ueshima et al. |
| | (Continued) | |

FOREIGN PATENT DOCUMENTS

| | | |
|---|---|---|
| CN | 102867983 A | 1/2013 |
| JP | 3176172 B2 | 6/2001 |
| | (Continued) | |

OTHER PUBLICATIONS

International Search Report for PCT/KR2018/010431 (PCT/ISA/210) dated Mar. 13, 2019.
(Continued)

*Primary Examiner* — Jeremiah R Smith
(74) *Attorney, Agent, or Firm* — Birch, Stewart, Kolasch & Birch, LLP

(57) ABSTRACT

A method for producing a lithium metal negative electrode structure including the steps of: (a) forming a lithium metal layer on a portion of one side or both sides of a current collector, wherein a non-coated portion of the current collector, on which a tab will be formed, is included on one side of the current collector, and wherein a stepped part is present between the non-coated portion of the current collector and the coated portion of the lithium metal layer; (b) coating and curing a photocurable material, or attaching an insulating tape, onto the stepped part between the non-coated portion of the current collector and the coated portion of the lithium metal layer; and (c) punching the result of step (b) into a unit electrode to produce the lithium metal negative electrode structure.

18 Claims, 7 Drawing Sheets

(51) Int. Cl.
   *H01M 4/1395*   (2010.01)
   *H01M 10/052*   (2010.01)
   *H01M 10/058*   (2010.01)
   *H01M 4/02*   (2006.01)
   *H01M 10/0525*   (2010.01)

(52) U.S. Cl.
   CPC ....... *H01M 10/052* (2013.01); *H01M 10/058* (2013.01); *H01M 4/66* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 7,622,225 B2 | 11/2009 | Ota et al. | |
| 10,103,385 B2 * | 10/2018 | Lim | H01M 4/505 |
| 2002/0086213 A1 | 7/2002 | Utsugi | |
| 2002/0182488 A1 | 12/2002 | Cho et al. | |
| 2006/0035152 A1 | 2/2006 | Nishimura et al. | |
| 2006/0051678 A1 | 3/2006 | Kim et al. | |
| 2009/0130548 A1 | 5/2009 | Lee | |
| 2013/0216892 A1 | 8/2013 | Matsuura et al. | |
| 2014/0227582 A1 * | 8/2014 | Nakashima | H01M 10/0585 429/162 |
| 2016/0149269 A1 * | 5/2016 | Fan | H01M 10/4235 429/50 |
| 2016/0294015 A1 * | 10/2016 | Tanaka | H01M 50/463 |
| 2016/0351900 A1 * | 12/2016 | Sekiya | H01M 4/483 |
| 2017/0033330 A1 * | 2/2017 | Matsuura | H01M 50/411 |
| 2017/0256767 A1 * | 9/2017 | Popovici | H01M 10/0569 |
| 2017/0301962 A1 | 10/2017 | Park et al. | |
| 2018/0371270 A1 * | 12/2018 | Graunke | C08F 265/06 |

FOREIGN PATENT DOCUMENTS

| | | | |
|---|---|---|---|
| JP | 2003-36842 A | 2/2003 | |
| JP | 2006-40878 A | 2/2006 | |
| JP | 2002-141058 A | 5/2007 | |
| JP | 2012-234822 A | 11/2012 | |
| JP | 2016-71955 A | 5/2016 | |
| KR | 10-2006-0083171 A | 7/2006 | |
| KR | 10-2007-0021018 A | 2/2007 | |
| KR | 10-2011-0007785 A | 1/2011 | |
| KR | 10-2015-0098445 A | 8/2015 | |
| KR | 10-2016-0091732 * | 8/2016 | H01M 4/04 |
| KR | 10-2016-0091732 A | 8/2016 | |
| KR | 10-1699175 B1 | 1/2017 | |
| KR | 10-2017-0055722 A | 5/2017 | |
| WO | WO 2012/056846 A1 | 5/2012 | |
| WO | WO 2015/087657 A1 | 6/2015 | |

OTHER PUBLICATIONS

Extended European Search Report, dated May 14, 2020, for European Application No. 18869520.9.

\* cited by examiner

PRIOR ART
[FIG. 1]
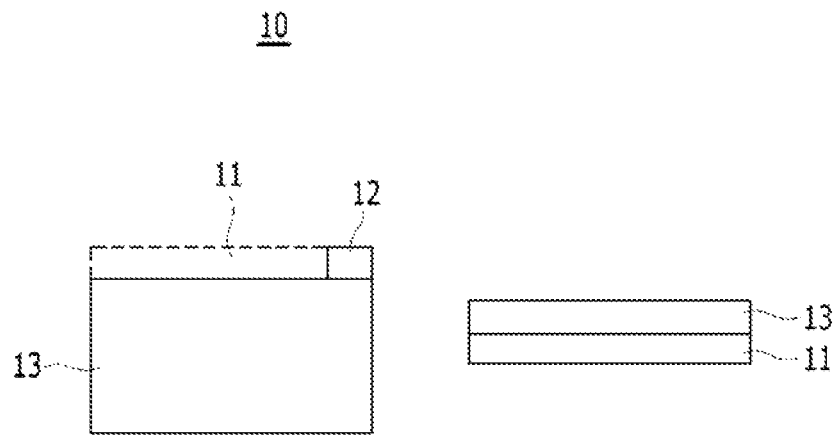

[FIG. 2]
PRIOR ART
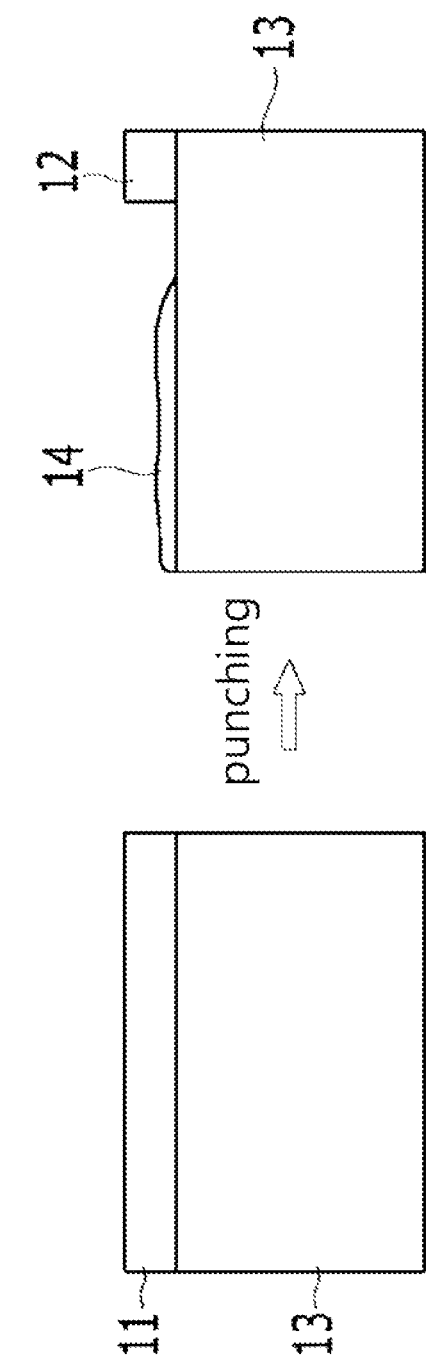

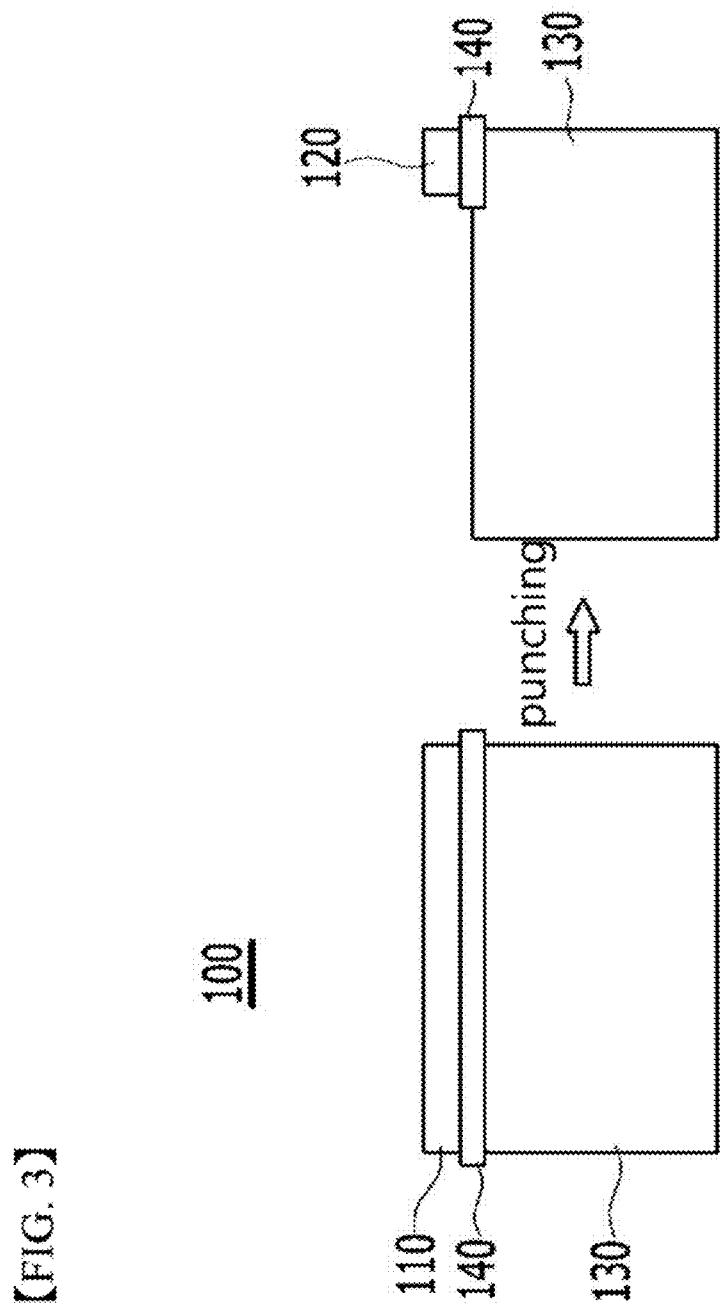
[FIG. 3]

[FIG. 4]
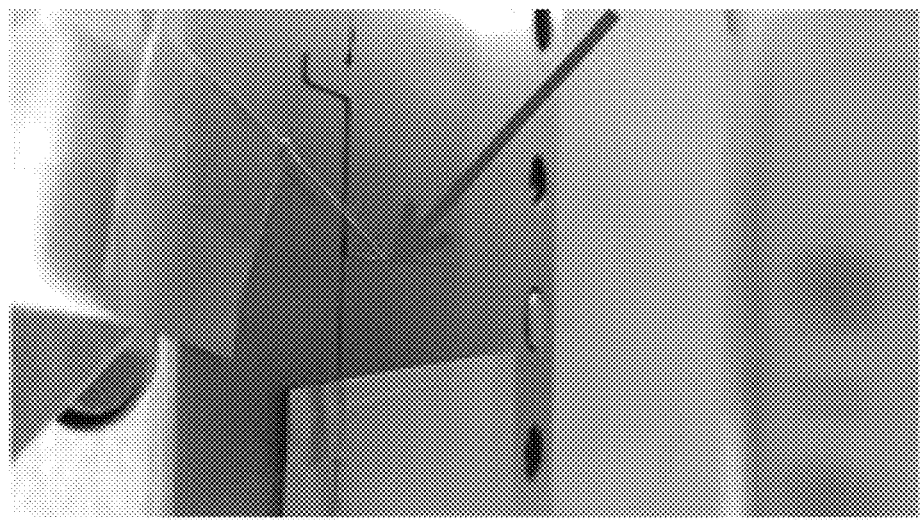
Li metal is inserted in the mold gap due to burr generation

[FIG. 5]
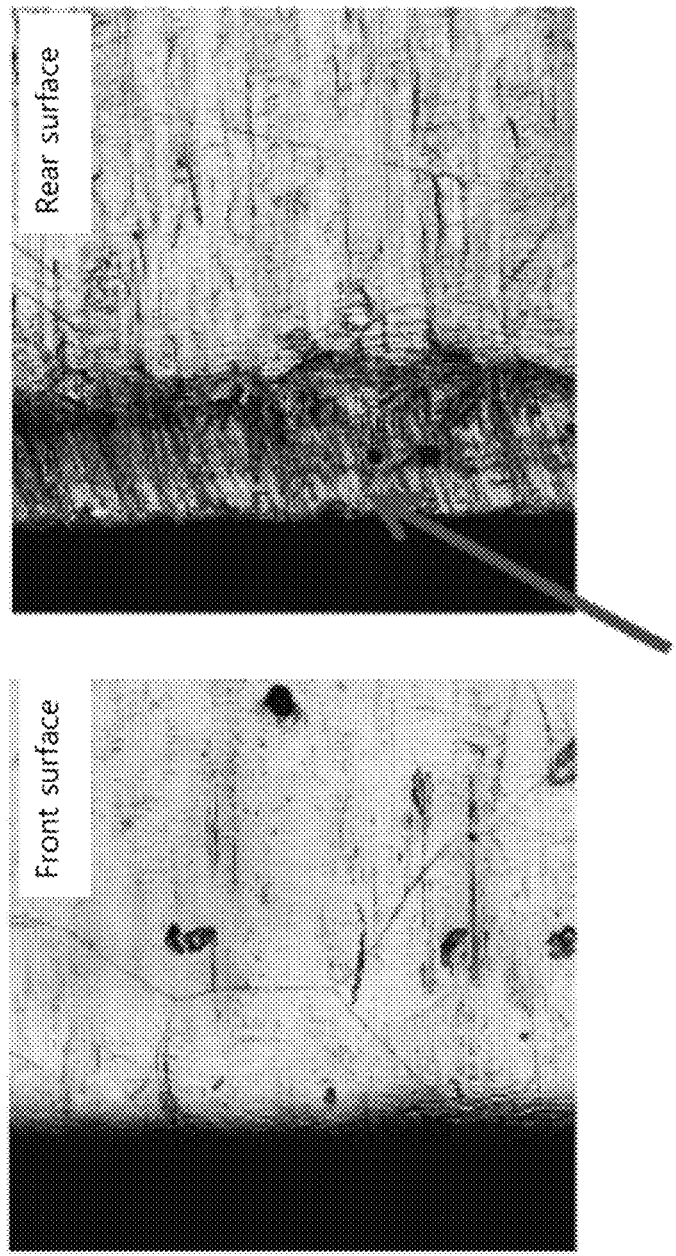

[FIG. 6]

[FIG. 7]

METHOD FOR PRODUCING LITHIUM METAL NEGATIVE ELECTRODE STRUCTURE AND LITHIUM METAL NEGATIVE ELECTRODE STRUCTURE

CROSS-REFERENCE TO RELATED APPLICATION(S)

This application claims the benefit of filing date of Korean Patent Application No. 10-2017-0141502 filed with Korean Intellectual Property Office on Oct. 27, 2017 and Korean Patent Application No. 10-2018-0105740 filed with Korean Intellectual Property Office on Sep. 5, 2018, the entire content of which is incorporated herein by reference.

TECHNICAL FIELD

The present invention relates to a method for producing a lithium metal negative electrode structure and a lithium metal negative electrode structure.

BACKGROUND ART

Recently, energy storage technology has been given an increasing attention. As the field of application of energy storage technology has been extended to energy for cellular phones, camcorders and notebook PC and even to energy for electric vehicles, Efforts toward the research and development for electrochemical devices have been actualized more and more.

Electrochemical devices have been most spotlighted in this respect, and among them, development of rechargeable secondary batteries has been focused. Recently, research and development of such batteries have been conducted about designing new electrodes and batteries in order to improve capacity density and specific energy.

Among the currently applied secondary batteries, lithium secondary batteries developed in the early 1990's have been spotlighted due to their advantages of higher operating voltages and much higher energy densities as compared to conventional batteries, such as Ni-MH, Ni—Cd and sulfuric acid-lead batteries using an aqueous electrolyte.

In general, lithium secondary batteries are constructed by embedding an electrode assembly including a positive electrode, a negative electrode and a separator interposed between the positive electrode and the negative electrode in the form of a laminated or wound structure in a battery case and introducing a non-aqueous electrolyte solution therein.

At this time, the lithium metal used as the negative electrode is a material which is most highlighted as a negative electrode material for a high energy density battery because it has a low density (0.54 g/cm$^3$) and a very low standard reduction potential (−3.045 V SHE). In addition, despite the problems that arise due to their high chemical activity, with the continuous increase and rapid development of the use of mobile communication and portable electronic devices in recent years, the demand for the development of high energy density secondary batteries is continuously increasing. Thus, the need for the use of lithium metal negative electrodes continues to rise.

In this case, when using a lithium metal electrode as the negative electrode, generally, a lithium metal negative electrode structure formed by attaching a lithium foil onto a planar current collector, has been used.

FIG. 1 shows a plan view and a vertical cross-sectional view of a negative electrode structure produced by attaching a lithium foil onto a conventional planar current collector.

FIG. 2 is a view schematically showing a method for producing such a negative electrode structure.

Referring to FIGS. 1 and 2, the lithium metal negative electrode sheet 10 in which a lithium metal 13 is pressed or vapor-deposited on a metal foil 11 of the current collector is punched into a unit electrode for producing electrodes, and at the same time, the metal foil 11, which is a current collector, is also simultaneously cut to form a tab 12.

At this time, the lithium metal 13 has a soft characteristic, so that the lithium metal 13 remains as a residue on a punching mold, or a residual lithium metal 14 in the form of burrs formed during punching exists in the lithium metal negative electrode which causes inhibition of the safety and processability.

Moreover, since the current collector metal foil must also be cut into a unit electrode during punching, the cutting strength between a tab forming portion where only a current collector metal foil is cut, and a unit electrode portion where a lithium metal and a current collector metal foil are simultaneously cut is different, and thus, the cutting knife strength of a punching mold should be taken into consideration, and there is also a problem that the lithium metal with soft characteristics is inserted in male and female molds.

In order to solve these problems, conventionally, laser punching is performed in the punching process of the lithium metal electrode sheet, or after punching, rolling or the like should be performed in order to flatten the remaining lithium metal in the form of burrs. Thus, there is a problem that it is inefficient in terms of cost and process.

Therefore, a lithium metal negative electrode structure capable of solving the above-mentioned problems while improving such current process is highly required.

DETAILED DESCRIPTION OF THE INVENTION

Technical Problem

The present invention has been made to solve the problems of conventional techniques and other technical problems that have yet to be resolved.

As a result of a variety of extensive and intensive studies and experiments to solve the problems described above, the present inventors have found that in the method for producing a lithium metal negative electrode structure, when a photocurable material is coated and cured, or an insulating tape is attached, onto a stepped part between a non-coated portion of a current collector and a coated portion of a lithium metal layer, and then subjected to an electrode punching process, not only the above-mentioned problems of conventional techniques can be solved, but also the lithium metal negative electrode structure produced in this manner includes an insulating layer or an insulating tape made of a photocurable material at a stepped part between the tab and the coated portion of a lithium metal layer, and therefore, it is possible to achieve an additional effect capable of preventing short circuits with the negative electrode material due to the exposure of a lithium metal layer on the tab in the secondary battery, thereby completing the present invention.

Technical Solution

According to an aspect of the present invention, there is provided a method for producing a lithium metal negative electrode structure comprising the steps of:

(a) forming a lithium metal layer on a portion of one side or both sides of a current collector, wherein a non-coated portion of the current collector, on which a tab will be formed is included on one side of the current collector, and wherein a stepped part is present between the non-coated portion of the current collector and the coated portion of the lithium metal layer;

(b) coating and curing a photocurable material, or attaching an insulating tape, onto the stepped part between the non-coated portion of the current collector and the coated portion of the lithium metal layer; and (c) punching the result of step (b) into a unit electrode to produce the lithium metal negative electrode structure.

In addition, the production method according to the present invention may include forming a tab by punching the non-coated portion of the current collector simultaneously with step (c), or (d) forming a tab by punching the non-coated portion after step (c).

That is, the present inventors have conducted extensive and intensive studies to solve the above-mentioned problems that may occur when pressing or vapor-depositing a lithium metal on a current collector due to a soft property of lithium metal in the past, and have found that when forming a photocurable material or attaching an insulating tape onto a stepped part between a non-coated portion of the current collector and a coated portion of the lithium metal layer before the punching process, the conventional problems occurring in the punching process for forming a tab can be solved.

In this case, the stepped part refers to a portion having a width of 2 mm to 5 mm in the vertical direction with reference to a boundary between a non-coated portion of a current collector and a coated portion where a lithium metal layer is formed. That is, the stepped part includes a boundary, and means a portion having a width of 2 mm to 5 mm in the vertical direction with reference to the boundary, and in particular, a portion having a width of 2 mm to 4 mm.

Here, the photocurable material to be coated and cured onto the stepped part is not particularly limited, but specifically, it may be an ultraviolet curable material which is crosslinked by ultraviolet rays, that is, is cured by irradiation with ultraviolet rays.

The ultraviolet curable material may be an oligomer or a low molecular weight polymer having a viscosity of 10 cps to 100 cps which can be polymerized with said material, and then cured by irradiating ultraviolet rays.

In particular, the viscosity of the oligomer or low molecular weight polymer may be 30 cps to 100 cps, and more specifically 50 cps to 100 cps.

The viscosity refers to a viscosity which is measured with a Brookfield viscometer, and HAAKE Visco Tester 550 is used.

A general ultraviolet curable material is a liquid material with low viscosity composed of a monomer and an oligomer, but since said material is injected into the corresponding part in the form of oligomer having a viscosity in the above range or a polymer having a low molecular weight, the material is easily coated and is hardly flowable even after coating, thereby achieving an effect of optimally improving sealing properties.

The oligomer may be, for example, at least one selected from the group consisting of epoxy-based, urethane-based, acrylate-based, silicone-based, hydroxyl-based and acrylic acid derivatives, and the low molecular weight polymer may be at least one selected from the group consisting of an unsaturated polyester-based material and a polyacrylate-based material. For example, it may be polyester acrylate, epoxy acrylate, urethane acrylate or polyurethane, but is not limited thereto.

Specifically, there may be mentioned acrylate-based materials such as TMPTA (trimethylolpropane triacrylate) or ETPTA (ethoxylated trimethylopropane triacrylate).

These ultraviolet curable materials may be coated as a mixture in which the oligomer or the low molecular weight polymer is mixed with a crosslinking agent and a photoinitiator for polymerization.

As the crosslinking agent, conventionally known crosslinking agents may be used without limitation, and examples thereof may be at least one selected from the group consisting of an isocyanate-based compound, an epoxy-based compound, an aziridine-based compound, an acrylate-based compound such as TMSPA (3-(trimethoxysilyl)propylacrylate), and a metal chelate-based compound.

As the photoinitiator, conventionally known photoinitiators may be used without limitation, and examples thereof may be at least one selected from the group consisting of benzophenone, acetophenone, chloroacetophenone, diethoxyacetophenone (DEAP), benzoin, benzoin methyl ether, benzoin ethyl ether, benzoin isopropyl ether, benzoin isobutyl ether, benzoyl benzoic acid, methyl benzoyl benzoate, benzoin dimethyl ketal, 2,4-diethylthioxanthone, benzyl diphenyl sulfide, tetramethylthiuram monosulfide, azobisisobutylonitrile, benzyl, dibenzyl, diacetyl, beta-chloroanthraquinone, 2-benzyl-2-dimethylamino-1-(4-morpholinophenyl)-butane-1 {2-benzyl -2-dimethylamino-1-(4-morpholinophenyl)-butan-1-one}, 2,4,6-trimethylbenzoyldiphenylphosphine oxide, 1-hydroxycyclohexyl phenylketone, 2-hydroxy-2-methyl-1-phenylpropan-1-one, 1-[4-(2-hydroxyethoxy)-phenyl]-2-hydroxy-2-methyl-1-propan-1-one, phenyl bis(2,4,6-trimethylbenzoyl)phosphine oxide, 1-phenyl-2-hydroxy-2-methyl propaneone (HMPP), α-amino acetophenone, thioxanthone and 2-ethyl anthraquinone (2-ETAQ).

In some cases, the ultraviolet curable material may be added to the corresponding part in a state where a predetermined thickener is added as a monomer.

The thickener that can increase the viscosity of these materials may be carboxymethyl cellulose, hydroxyethyl cellulose, polyvinyl alcohol, polyvinylacrylate, and the like.

The ultraviolet curable material having such a viscosity can be cured by being irradiated with ultraviolet rays (UV) in a range of 3 to 20 seconds after being added to the stepped part.

On the other hand, as a simpler method, an insulating tape can be attached to the stepped portion instead of coating and curing a photocurable material. At this time, the insulating tape may made of polyethylene terephthalate or polyimide.

The coating thickness of the photocurable material or the thickness of the insulating tape may be 10 nm to 1 μm, specifically 100 nm to 500 nm.

When the thickness is too thick beyond the above range, the punching process is inefficient, for example, the strength of the knife being strengthened during the electrode punching process and the tap forming process. When the thickness is too thin, the desired effect of the present invention can not be exhibited to a sufficient extent, which is not preferable.

Meanwhile, the current collector in which the lithium metal layer is formed may be fabricated to have a thickness of 3 to 200 μm. Such a current collector is not particularly limited as long as it has electrical conductivity without causing a chemical change in the battery. For example, copper, copper alloy, stainless steel, aluminum, nickel, titanium, calcined carbon, a surface treated material of copper or aluminum or stainless steel with carbon, nickel, titanium, silver or the like, an aluminum-cadmium alloy, etc. may be used. Specifically, copper, copper alloy, stainless steel, aluminum, nickel, and more particularly, copper may be used. The current collector may form fine irregularities on its surface to increase the adhesion strength of the electrode active material, and it can be used in various shapes such as such as a film, a sheet, a foil, a net, a porous body, a foamed body, a non-woven fabric, etc.

Further, the lithium metal layer may have a thickness of 20 μm to 150 μm, and more specifically 20 μm to 100 μm.

When the thickness of the lithium metal layer is too small beyond the above range, the amount of lithium metal acting as an active material is smaller than that of the current collector, and thus a sufficient capacity can not be exhibited. When the thickness is too thick, the output characteristics are deteriorated, or it is difficulty to prevent problems caused by the soft characteristics, which is not preferable.

Meanwhile, in step (a), the method of forming the lithium metal layer on the current collector is not particularly limited, but it may be performed by vapor-depositing or pressing a lithium metal. Specifically, there is a problem such that the shape can be deformed by the soft characteristic of the lithium metal, and therefore, it can be formed by pressing.

Here, the size of the pressing can be appropriately selected in consideration of the thickness of the lithium metal layer and the like.

Another embodiment of the present invention provides a lithium metal negative electrode structure thus produced, wherein the lithium metal negative electrode structure comprises:

a current collector;

a tab extending vertically from the current collector; and a lithium metal layer formed on one side or both sides of the current collector excluding the tab, wherein an insulating layer comprising a cured photocurable material is formed, or an insulating tape is attached, onto the stepped part between the tab and the lithium metal layer.

The lithium metal negative electrode structure forms an insulating layer, or attaches an insulating tape, onto the stepped part between the tab and the lithium metal layer before punching into the unit electrode to achieve the above-described effects. Therefore, it is possible to achieve an additional effect of preventing a short circuit with the positive electrode material due to the exposure of the lithium metal layer on the tab in a subsequent secondary battery without another additional step after the electrode preparation process.

Therefore, the lithium metal negative electrode structure according to the present invention can minimize the generation of burrs, thus solving the safety problem that may be caused by the residual lithium in the form of burrs existing on the negative electrode structure. In addition, since the presence of the lithium metal layer on the tab can prevent a short circuit that may occur in contact with the positive electrode material thereafter, local heat generation and explosion due to the short circuit, and the like, thereby being very effective in improving the safety of the battery.

At this time, the tab may be integrally formed with the current collector. That is, the tab may be formed by punching a non-coated portion where a lithium metal layer is not coated as described above.

The stepped part between the tab on which the insulating layer or the insulating tape is formed and the lithium metal layer is formed is the same as described above in the production method. Since the insulating layer or the insulating tape is the same as those formed in the production method, the width may be 2 mm to 5 mm, specifically, 2 mm to 4 mm in the vertical direction with reference to a boundary between the lithium metal layer and the tab, and the thickness may be 10 nm to 1 μm, specifically, 100 nm to 500 nm.

Here, the thickness means a length in the laminating direction of the current collector and the lithium metal layer.

Further, since the insulating layer or the insulating tape is cut together into the unit electrode punching process, the width may be equal to the width of the tab, or it may extend slightly in the outer direction of the unit electrode and may be longer by a predetermined length in a range of 1 mm to 5 mm than the width of the tab.

Meanwhile, the negative electrode structure may be used for a secondary battery, and specific structures of the secondary battery will be described below.

The type of the secondary battery is not particularly limited, and specific examples thereof include a lithium ion secondary battery, a lithium (Li) polymer secondary battery, or a lithium (Li) ion polymer secondary battery, having advantages such as high energy density, discharge voltage and output stability.

Generally, a lithium secondary battery is composed of a positive electrode, a negative electrode, a separator, and a lithium salt-containing non-aqueous electrolyte.

The positive electrode can be produced, for example, by coating a mixture of a positive electrode active material, a conductive material and a binder on a positive electrode current collector, and then drying the mixture. If necessary, a filler may be further added to the mixture.

The positive electrode current collector and/or the extended current collector are generally manufactured to have a thickness of 3 to 500 μm. Such positive electrode current collector and the extended current collector are not particularly limited as long as they have high conductivity without inducing any chemical change in the battery. For example, stainless steel, aluminum, nickel, titanium, calcinated carbon, or a surface treated material of aluminum or stainless steel with carbon, nickel, titanium, silver or the like may be used. The current collector and the extended current collector may form fine irregularities on their surface to increase the adhesion strength of the positive electrode active material, and it may be used in various shapes such as a film, a sheet, a foil, a net, a porous body, a foam, a non-woven fabric, and the like.

The positive electrode active material may include layered compounds such as lithium cobalt oxide ($LiCoO_2$) or lithium nickel oxide ($LiNiO_2$) or compounds substituted with one or more transition metals; lithium manganese oxides such as the formulas $Li_{1+x}Mn_{2-x}O_4$ (wherein, x is 0 to 0.33), $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides represented by the formula $LiNi_{1-x}M_xO_2$ (wherein, M=Co, Mn, Al, Cu, Fe, Mg, B or Ga, x=0.01 to 0.3); lithium manganese composite oxides represented by the formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); $LiMn_2O_4$ where some of Li atoms in the formula are substituted with alkaline earth metal ions; disulfide compounds; $Fe_2(MoO_4)_3$; and the like, but are not limited thereto.

The conductive material is generally added in an amount of 1 to 30% by weight based on the total weight of the mixture containing the positive electrode active material.

The conductive material is not particularly limited as long as it has conductivity without inducing any chemical change in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

The binder is a component that assists in bonding between the active material and the conductive agent or the like and bonding to the current collector, and is usually added in an amount of 1 to 30% by weight based on the total weight of the mixture containing the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is optionally used as a component to inhibit positive electrode expansion. The filler is not particularly limited so long as it is a fibrous material that does not cause chemical changes in the battery. Examples of the filler include olefin-based polymers such as polyethylene and polypropylene; and fibrous materials such as glass fiber and carbon fiber.

The negative electrode may be composed of a lithium metal negative electrode in which a lithium metal layer is formed on the current collector as described above.

The separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. As examples of the separator, there may be mentioned olefin-based polymers such as polypropylene, which is chemically resistant and hydrophobic; a sheet or a non-woven fabric made of glass fiber, polyethylene or the like. When a solid electrolyte such as a polymer is used as the electrolyte, the solid electrolyte may also serve as a separator.

The electrolyte may be a lithium salt-containing non-aqueous electrolyte, which consists of a non-aqueous electrolyte and lithium salt. As the non-aqueous electrolyte, a non-aqueous organic solvent, an organic solid electrolyte, an inorganic solid electrolyte or the like may be used, but is not limited thereto.

As examples of the non-aqueous organic solvent, there may be mentioned non-erotic organic solvents, such as N-methyl-2-pyrrolidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate (FEC), propene sultone (PRS), etc.

In a specific embodiment, a lithium salt-containing non-aqueous electrolyte may be prepared by adding a lithium salt, such as $LiPF_6$, $LiClO_4$, $LiBF_4$, or $LiN(SO_2CF_3)_2$ to a mixed solvent of a cyclic carbonate, such as EC or PC, which is a high dielectric solvent, and a linear carbonate, such as DEC, DMC, or EMC, which is a low-viscosity solvent.

BRIEF DESCRIPTION OF THE DRAWINGS

FIG. 1 is a schematic view of a negative electrode structure according to the prior art.

FIG. 2 is a schematic view of a process of producing the negative electrode structure of FIG. 1.

FIG. 3 is a schematic view of a process of producing a negative electrode structure according to an embodiment of the present invention.

FIG. 4 is a photograph of a mold after punching for producing a conventional negative electrode structure.

FIG. 5 is a photograph of a negative electrode structure after punching for producing a conventional negative electrode structure.

FIG. 6 is a photograph of a negative electrode structure after punching for producing a negative electrode structure according to Example 1 of the present invention.

FIG. 7 is a photograph of a negative electrode structure after punching for producing a negative electrode structure according to another Example 2 of the present invention.

DETAILED DESCRIPTION OF THE EMBODIMENTS

Now, preferred embodiments of the present invention will be described in detail with reference to the accompanying drawings. However, these embodiments are for illustrative purposes only and are not intended to limit the scope of the present invention.

Referring to FIG. 3, first, the lithium metal is coated or pressed on one side or both sides of a current collector so as to include a coated portion 130 in which a lithium metal layer is formed, and a non-coated portion 110 in which a lithium metal layer is not formed and on which a tab will be formed by a punching process.

Then, the photocurable material 140 is coated and cured, or an insulating tape 140 is attached, onto the stepped part between the non-coated portion 110 and the coated portion 130 of the lithium metal layer, and then punched into a unit electrode. At this time, the lithium metal negative electrode structure 100 is punched into a unit electrode for producing an electrode, and at the same time, the non-coated portion 110 is also punched to form a tab 120.

When producing a lithium metal negative electrode structure 100 in this manner, it is possible to solve the problem of the generation of lithium burrs encountered with a conventional punching process.

In addition, the lithium metal negative electrode structure 100 thus produced has a structure in which an insulating layer 140 made of a photocurable material is formed, or an insulating tape 140 is attached, onto the stepped part between the tab 120 extended from the current collector by the production process and the coated portion 130 of the lithium metal layer.

Therefore, it is possible to prevent a short circuit with the positive electrode material due to the exposure of the lithium metal layer on the tab in the subsequent secondary battery.

Hereinafter, the present invention will be described in further detail with reference to the following examples. However, these examples are for illustrative purposes only and are not intended to limit the scope of the present invention.

Comparative Example 1

A negative electrode sheet was prepared by vapor-depositing a lithium metal (thickness: 40 μm) except for one side so as to leave a non-coated portion for forming a tab on a current collector made of copper (thickness: 30 μm).

Subsequently, a punching process was performed to form a tab while being produced as a unit electrode. The photograph of a mold after punching and the optical photographs of the front and rear surfaces of the unit electrode are shown in FIGS. 4 and 5.

Referring to FIG. 4, it can be confirmed that a residue of lithium metal due to the generation of lithium metal burrs is inserted into the mold. Referring to FIG. 5, it can be confirmed that the outer portion of the electrode is pushed out and a surface defect occurs as shown in the photograph on the rear side of the unit electrode.

Example 1

A negative electrode sheet was prepared by vapor-depositing a lithium metal (thickness: 40 μm) except for one side so as to leave an non-coated portion for forming a tab on a current collector composed of copper (thickness: 30 μm).

An insulating tape (thickness: 500 nm) was taped to a stepped part between the coated portion where the lithium metal was formed and the non-coated portion (width including the boundary between the coated part and the non-coated part: 3 mm, and the length was taped to be the same as the length of a tab to be formed later).

Subsequently, a punching process was performed to form a tab while being produced as a unit electrode. The optical photographs of the front and rear sides of the unit electrode after the punching process is shown in FIG. 6.

Referring to FIG. 6, it can be confirmed that the unit electrode is punched out smoothly without being pushed out at the outer portion of the electrode, as shown in the photograph on the rear side.

Example 2

A negative electrode sheet was prepared by vapor-depositing a lithium metal (thickness: 40 μm) except for one side so as to leave an non-coated portion for forming a tab on a current collector composed of copper (thickness: 30 μm). ETPTA (ethoxylated trimethylolpropane triacrylate, viscosity: 60 cps) as a photocurable material, TMSPA (3-(trimethoxysilyl)propylacrylate) as a crosslinking agent, and 2-hydroxy-2-methylpropiophenone as a photoinitiator were mixed in a weight ratio of 10:0.5:0.5, and the mixture was coated onto a stepped part between a coated portion where the lithium metal was formed and a non-coated portion (thickness: 500 nm, width including the boundary between the coated portion and the non-coated portion: 3 mm, and length: the same as the length of the tab to be formed later), and then cured by UV curing method.

Subsequently, a punching process was performed to form a tab while being produced as a unit electrode. The optical photographs of the front and rear sides of the unit electrode after the punching process is shown in FIG. 7.

Referring to FIG. 7, it can be confirmed that the unit electrode is punched out smoothly without being pushed out at the outer portion of the electrode, as shown in the photograph on the rear side.

Experimental Example 1

A positive electrode mixture having a composition of 90 wt % of a positive electrode active material ($LiCoO_2$), 5 wt % of Super-P (conductive material), and 5 wt % of PVDF (binding agent) was added to NMP (N-methyl-2-pyrrolidone) as a solvent to prepare a positive electrode slurry. The slurry was then coated onto an aluminum current collector to produce a positive electrode.

10 Secondary batteries were manufactured by using the unit electrodes produced in Comparative Example 1 and Example 1 as negative electrodes, and the above positive electrode, a polyethylene membrane (Celgard, thickness: 20 μm) as a separator, and a liquid electrolyte in which $LiPF_6$ was dissolved at 1 M in a mixed solvent of ethylene carbonate, dimethylene carbonate, and diethyl carbonate in a ratio of 1:2:1.

The secondary batteries were charged/discharged at intervals of 2.5 V to 4.35 V under 1.0 C for 10 cycles, and the number of short-circuited and ignited batteries was measured, and the results are shown in Table 1 below.

TABLE 1

| | Number of ignitions |
|---|---|
| Example 1 | 1/20 |
| Comparative Example 1 | 9/20 |

As shown in Table 1, it can be confirmed that the secondary batteries using the negative electrode according to the present invention have higher safety.

While the present invention has been shown and described with reference to drawings and embodiments thereof, it will be understood by those skilled in the art that various applications and modifications can be made within the scope of the present invention based on the contents described above.

INDUSTRIAL APPLICABILITY

As described above, the lithium metal negative electrode structure according to the present invention is produced by coating and curing a photocurable material, or attaching an insulating tape, onto the stepped part between the non-coated portion of the current collector and the coated portion of the lithium metal layer, and then performing a punching process. Therefore, it is possible to solve the problem of the generation of lithium burrs encountered with a conventional punching process, and thus there is no need to add separate processes such as performing laser punching, or rolling to flatten a residual lithium metal in the form of burrs after punching, which is efficient in terms of cost and process.

In addition, since the lithium metal negative electrode structure manufactured in this manner includes the insulating layer or the insulating tape made of the photocurable material by the above process in a stepped part between the tab and the coated portion of the lithium metal layer, it is possible to achieve an additional effect of preventing prevent a short circuit with the positive electrode material due to the exposure of the lithium metal layer on the tab in the subsequent secondary battery.

The invention claimed is:

1. A method for producing a lithium metal negative electrode structure comprising the steps of:
   (a) forming a lithium metal layer on a portion of one side or both sides of a current collector,
      wherein a non-coated portion of the current collector, on which a tab will be formed, is included on one side of the current collector, and wherein a stepped part is present between the non-coated portion of the current collector and the coated portion of the lithium metal layer;
   (b) coating and curing a photocurable material, or attaching an insulating tape, onto the stepped part between the non-coated portion of the current collector and the coated portion of the lithium metal layer; and
   (c) punching the result of step (b) into a unit electrode to produce the lithium metal negative electrode structure,
      wherein the tab extends from one side of the unit electrode such that a length of the tab along the one side of the unit electrode is less than a length of the one side of the unit electrode, and
      wherein a length of the photocurable material or insulating tape along the one side of the unit electrode is greater than the length of the tab and less than the length of the one side of the unit electrode.

2. The method for producing the lithium metal negative electrode structure according to claim 1, wherein the method further comprises forming the tab by punching the non-coated portion of the current collector simultaneously with step (c).

3. The method for producing the lithium metal negative electrode structure according to claim 1, wherein the method further comprises (d) forming the tab by punching the non-coated portion of the current collector after step (c).

4. The method for producing the lithium metal negative electrode structure according to claim 1, wherein the stepped part is a portion having a width of 2 mm to 5 mm extending along a boundary between the non-coated portion of the current collector and the coated portion where the lithium metal layer is formed.

5. The method for producing the lithium metal negative electrode structure according to claim 1, wherein in step (b) the photocurable material is coated and cured, and the photocurable material is an ultraviolet curable material and is cured by irradiation with ultraviolet rays.

6. The method for producing the lithium metal negative electrode structure according to claim 5, wherein the ultraviolet curable material is an oligomer or a low molecular weight polymer having a viscosity of 10 cps to 100 cps which is then cured by irradiating ultraviolet rays.

7. The method for producing the lithium metal negative electrode structure according to claim 6, wherein the oligomer is at least one selected from the group consisting of epoxy-based, urethane-based, acrylate-based, silicone-based, hydroxyl-based and acrylic acid derivatives, and the low molecular weight polymer is at least one selected from the group consisting of an unsaturated polyester-based material and a polyacrylate-based material.

8. The method for producing the lithium metal negative electrode structure according to claim 1, wherein a coating thickness of the photocurable material or a thickness of the insulating tape is 10 nm to 1 μm.

9. The method for producing the lithium metal negative electrode structure according to claim 1, wherein the current collector is copper, copper alloy, stainless steel, aluminum, or nickel.

10. The method for producing the lithium metal negative electrode structure according to claim 1, wherein the lithium metal layer has a thickness of 20 μm to 100 μm.

11. The method for producing the lithium metal negative electrode structure according to claim 1, wherein step (a) is performed by vapor-depositing or pressing the lithium metal layer on the current collector.

12. A lithium metal negative electrode structure comprising:
   a current collector;
   a tab extending from the current collector; and
   a lithium metal layer formed on one side or both sides of the current collector excluding the tab,
      wherein an insulating layer comprising a cured photocurable material is formed, or an insulating tape is attached, onto a stepped part between the tab and the lithium metal layer,
      wherein the tab extends from one side of the unit electrode such that a length of the tab along the one side of the unit electrode is less than a length of the one side of the unit electrode, and
      wherein a length of the insulating layer or the insulating tape along the one side of the unit electrode is greater than the length of the tab and less than the length of the one side of the unit electrode.

13. The lithium metal negative electrode structure according to claim 12, wherein the tab is integrally formed with the current collector.

14. The lithium metal negative electrode structure according to claim 12, wherein the insulating layer or the insulating tape is formed to cover an end of the lithium metal layer and an end of the tab.

15. The lithium metal negative electrode structure according to claim 12, wherein a width of the insulating layer or the insulating tape is 2 mm to 5 mm extending along a boundary between the lithium metal layer and the tab.

16. The lithium metal negative electrode structure according to claim 12, wherein a width of the insulating layer or the insulating tape is equal to a width of the tab.

17. The lithium metal negative electrode structure according to claim 12, wherein a thickness of the insulating layer or the insulating tape is 10 nm to 1 μm.

18. A secondary battery comprising the lithium metal negative electrode structure according to claim 12.

* * * * *